United States Patent [19]

Dion-Biro

[11] 4,018,418

[45] Apr. 19, 1977

[54] FLOW GOVERNOR

[76] Inventor: Guy Dion-Biro, 46 Avenue du Chateau, 94300 Vincennes, France

[22] Filed: Feb. 27, 1976

[21] Appl. No.: 662,208

Related U.S. Application Data

[63] Continuation of Ser. No. 494,271, Aug. 2, 1974, abandoned.

[52] U.S. Cl. ............................. 251/63.6; 251/84; 137/505.22
[51] Int. Cl.² ........................................ F16K 31/363
[58] Field of Search ............ 137/501, 503, 505.21, 137/505.22; 251/62, 63, 63.5, 63.6, 84, 86, 210

[56] References Cited

UNITED STATES PATENTS

| | | | |
|---|---|---|---|
| 1,918,891 | 7/1933 | Barrett | 137/505.22 |
| 2,059,111 | 10/1936 | Joyce | 251/86 |
| 2,069,069 | 1/1937 | Horton | 251/86 |
| 2,892,608 | 6/1959 | Collins | 251/86 |
| 3,089,509 | 5/1963 | Collins | 251/210 |
| 3,098,501 | 7/1963 | McLeod | 137/505.22 |
| 3,155,367 | 11/1964 | Gifford | 251/86 |
| 3,270,757 | 9/1966 | Engler | 137/505.22 |
| 3,698,427 | 10/1972 | Baranowski, Jr. | 251/368 |
| 3,700,206 | 10/1972 | Jones | 251/84 |

*Primary Examiner*—Martin P. Schwadron
*Assistant Examiner*—G. L. Walton

[57] ABSTRACT

A gas flow governor for regulating the inlet of carbonic acid gas under high pressure delivered from a source of gas and the outlet of expanded gas, the governor comprising a piston slidable in a bore of a body and forming a chamber receiving expanded gas. The piston is acted on by springs to tend to reduce the size of the chamber and the piston has a rod with a rivet head shaped end on which is fixed with play a Teflon plunger of a valve member, the plunger having a frustoconical end. The rod with the plunger slides in a bushing having a cap with a coaxial inlet orifice for connecting with the gas source and an output orifice perpendicular to the inlet orifice and forming with the latter a shoulder with a valve seat.

3 Claims, 2 Drawing Figures

FLOW GOVERNOR

CROSS RELATED APPLICATION

This application is a continuation of co-pending application Ser. No. 494,271 filed Aug. 2, 1974 now abandoned.

FIELD OF THE INVENTION

This invention relates to improved flow governors intended for use in controlling the pressure, especially but not exclusively, of carbonic acid gas.

BACKGROUND

Flow governors currently in use appear by-and-large either in the form of a valvecock forced onto a seat by means of a cam or similar part operated by a flexible diaphragm distorting under the pressure of the gas, or as a piston valve controlling a series of ring-type joints closing off more-or-less a number of ports, or else as a rotary box, or finally as a conical-tipped needle pressed onto a seat of equivalent shape.

The use of a conical needle has drawbacks with respect to the known designs. Hitherto, the conical tip of the needle has been made of a flexible substance allowing a certain amount of distortion in order to meld to all the defects of configuration possibly present in the seat intended to cooperate with it. Said flexible substance was frequently India rubber or some analogous synthetic material. Use of such substances is barred in connection with use with carbonic acid gas which, on reacting with these materials, makes them porous. Furthermore the production of a metal valve requires fine precision in machining since the slightest error in parallax renders the closing of the controlled piping ineffective.

SUMMARY OF THE INVENTION

The improved flow governor in accordance with this invention overcomes these various disadvantages.

The governor of the invention is characterized by comprising a control piston having an independent and floating frusto conical plunger of a valve member which facilitates offsetting the defects in parallax and machining and is furthermore manufactured of a rigid substance whose coefficient of strain is very close to that of the metal. This material can, for example, be Teflon. The plunger is secured to the piston rod which controls it by a clamping arrangement with clearance obtained when it is machined. This form of mounting of the said plunger with the controlling piston rod allows it to take up its correct position on its seat and to be centered on the axis of the orifice to be closed off. Also this mounting allows it to be driven by the piston if, when necessary, the gas stream to be closed off is at atmospheric pressure, which means that the said mounting allows the control piston to "pull" the mounting.

BRIEF DESCRIPTION OF THE DRAWING

The invention will be better understood from the following description of one of its preferred embodiments and the annexed drawings, wherein.

DETAILED DESCRIPTION

Figure 1:
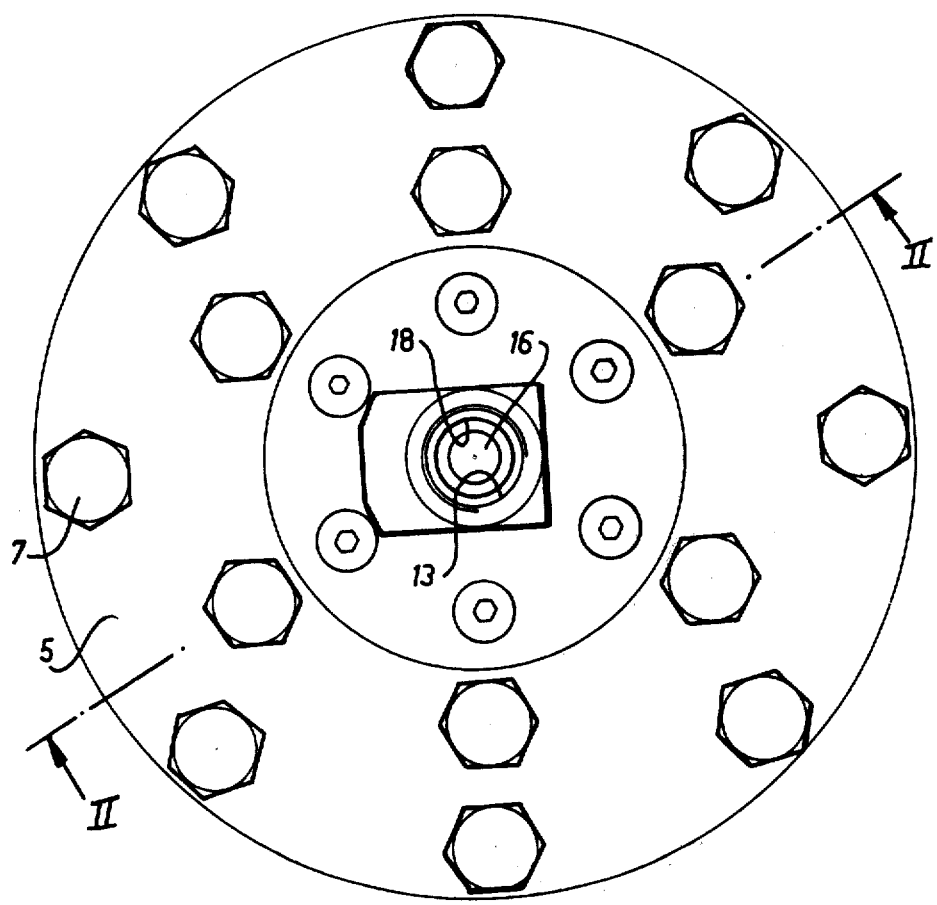
FIG. 1 is a plan view of the flow governor according to the invention.
Figure 2:
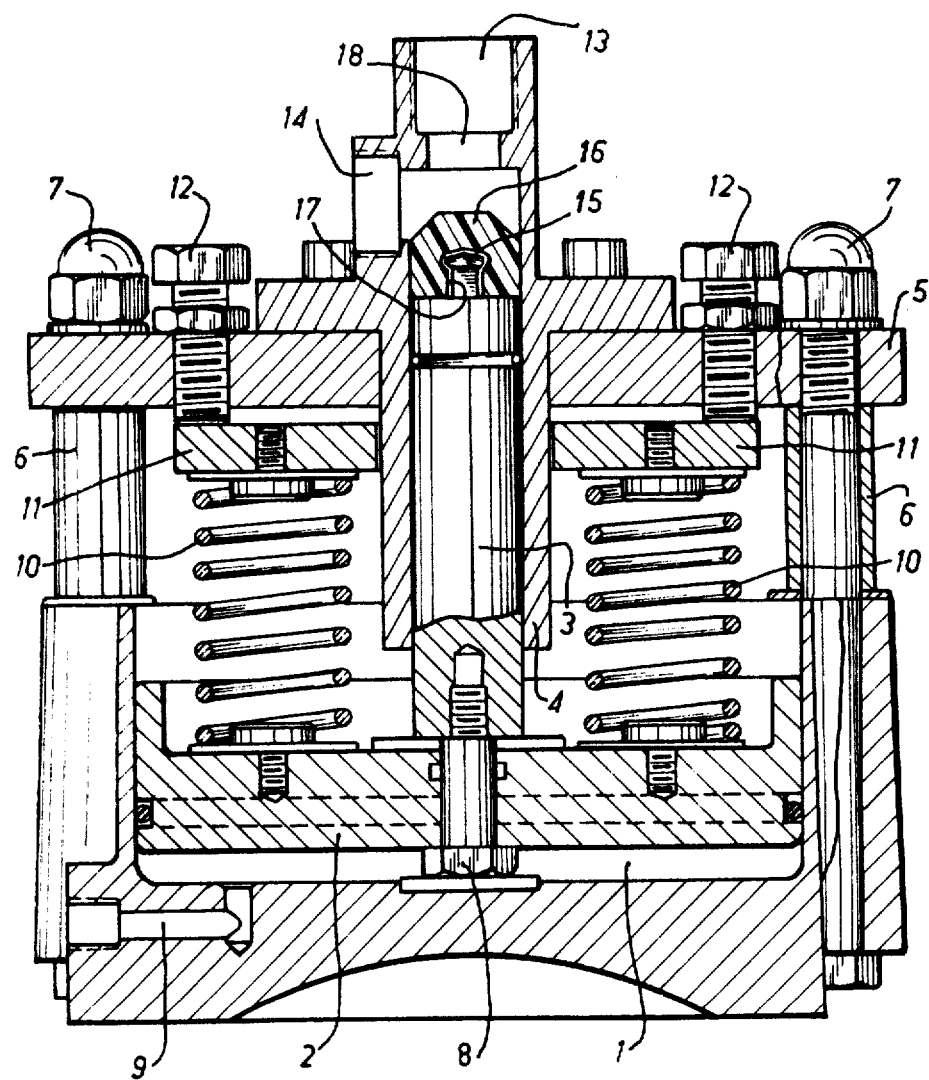
FIG. 2 is a sectional view of the said governor along line II—II of FIG. 1.

In FIGS. 1 and 2, the improved flow governor according to the invention is seen to be composed of a cylindrical control chamber 1 wherein moves a piston 2 whose rod or shaft 3 slides inside a bushing 4 fitted on a cheek 5 fastened above the said control chamber and supported by means of staybolts 6 maintained by screws 7 arranged on the periphery of chamber 1.

The shaft 3 is fastened to piston 2 by means of a bolt 8 whose head forms a stop when it is in the down position. An orifice 9 is provided to connect the control chamber 1 with the gas under pressure.

Over the piston 2, for example, three helicoidal springs 10 (two only appear in the section II—II) are arranged, of which one end abuts against the top of piston 2 and the other end on a platen 11 adjustable by means of screws 12 arrayed on cheek 5 in such a way as to allow calibration of piston 2 by means of the said springs 10.

The top portion of bushing 4 has two orifices 13 and 14 arranged at right angles to each other. The first is the inlet orifice 13 of the gas under pressure, liquid $CO_2$ gas for example, and the second orifice 14 opens into an expansion chamber (not shown) which itself communicates through orifice 9 with the control chamber 1.

The top end of shaft 3 of piston 2 comprises a protuberance 15 preferably of rivethead shape. A plunger 16 having a frustoconical end, made of Teflon, for example, is mounted on this protuberance 15. The lower portion of this plunger has a recessed cavity 17 whose shape corresponds practically to that of the protuberance 15 of rod 3 of piston 2. The machining of this recessed cavity is made with a tolerance allowing sufficient clearance of the protuberance 15 in cavity 17 while at the same time securing an effective clamping of the whole so that plunger 16 may have a certain clearance relative to rod 3 giving it the facility to be correctly located on its seat 18, which because of this is machined without specific tolerances, while guaranteeing perfect cooperation between them.

The governor according to the invention operates as follows:

The liquid carbonic acid gas arrives through orifice 13 and emerges through orifice 14, the plunger 16 being normally rendered open at rest under the action of springs 10 previously gauged by means of the screws 12 acting on platen 5 and piston 2. The gas under pressure enters an expansion chamber (not shown). Then the expanded gas enters through orifice 9 into the control chamber 1 in which it exerts a pressure on piston 2 opposing that exerted by springs 10 and will urge the frusto-conical end of plunger 16 toward its seat.

Obviously the position of plunger 16 is determined by the balancing of the pressures it undergoes from the flow of gas arriving through orifice 13 and secondly from the expanded gas whose pressure is transmitted to piston 2 in opposition to the springs 10.

If some disturbance occurs during operation, an imbalance is produced between the pressures and the plunger is closed shutting the aperture in seat 18 wholly or partially. As soon as the disturbance disappears the plunger 16 is withdrawn under the action of piston 2 in an extremely short time so that no expansion occurs in the stream, which would induce a lowering of temperature and, consequently an icing up.

The flow governor according to the invention safeguards installations using especially, but not exclusively, carbonic acid gas, without requiring extremely fine machining of the plunger while at the same time allowing the use of materials other than those currently used, for example rubber, which react with the gas to be regulated.

What is claimed is:

1. A flow governor for regulating the inlet of gas from a high pressure liquified source, said governor comprising a body having a cylindrical bore, a piston slidable in said bore and having a lower face with an abutment and an upper face with a central rod thereon, said lower face of the piston defining with said body a control chamber, a bushing fixed to said body and having an axial bore in which said piston rod is slidable, said bushing including a coaxial top cap in which said bore extends, said top cap having a first orifice coaxial with said bore and forming an inlet for high pressure liquified gas from a source thereof, and a second orifice perpendicular to the first orifice and to said bore for outlet of the gas for expansion thereof and supply of expanded gas to said control chamber, a plunger elastically mounted on said piston rod for free movement thereon and including a frusto-conically shaped end portion, said plunger being slidably displaceable in said bore and being self-centering when sliding in said cap, said cap including a wall with an aperture therein between said first and second orifices, said frusto-conically shaped end portion of said plunger facing said aperture in said wall which serves as a seat for said end portion, and resilient means acting on said upper face of the piston and on said body to urge the piston in a direction to reduce the size of the control chamber, said resilient means including a plurality of adjustable springs distributed on said upper face of the piston.

2. A flow governor according to claim 1 wherein said piston rod has an end with a protuberance thereon in the shape of a rivethead, said plunger having a receiving hole at the end opposite said frusto-conical end portion resiliently mounted with play on said protuberance on said piston to allow said plunger end portion to correctly seat itself at said aperture in the wall of the cap.

3. A flow governor according to claim 1 wherein said second orifice opens laterally in said cap and communicates with said bore such that said plunger progressively advances along said second orifice as said frusto-conically shaped end portion approaches said aperture.

* * * * *